(12) United States Patent
Harz et al.

(10) Patent No.: US 10,897,483 B2
(45) Date of Patent: Jan. 19, 2021

(54) INTRUSION DETECTION SYSTEM FOR AUTOMATED DETERMINATION OF IP ADDRESSES

(71) Applicant: International Business Machines Corporation, Armonk, NY (US)

(72) Inventors: Dirk Harz, Kassel (DE); Matthias Seul, San Francisco, CA (US); Jens Thamm, Lohfelden (DE); Gideon Zenz, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/100,728

(22) Filed: Aug. 10, 2018

(65) Prior Publication Data
US 2020/0053122 A1    Feb. 13, 2020

(51) Int. Cl.
    *H04L 29/06*    (2006.01)
(52) U.S. Cl.
    CPC .............................. *H04L 63/1491* (2013.01)
(58) Field of Classification Search
    CPC ........... H04L 63/1491; H04L 2463/144; H04L 2463/146; H04L 63/145; H04L 63/1408
    See application file for complete search history.

(56) References Cited

U.S. PATENT DOCUMENTS

| | | | | |
|---|---|---|---|---|
| 7,660,793 | B2* | 2/2010 | Indeck | G06F 16/353 |
| | | | | 707/999.005 |
| 8,625,604 | B2* | 1/2014 | Bando | H04L 45/7457 |
| | | | | 370/395.31 |
| 8,719,295 | B2 | 5/2014 | Chang et al. | |
| 8,813,236 | B1* | 8/2014 | Saha | H04L 63/1408 |
| | | | | 726/22 |
| 9,124,636 | B1* | 9/2015 | Rathor | H04L 63/20 |
| 9,195,826 | B1* | 11/2015 | Fang | G06F 21/56 |
| 2003/0033275 | A1* | 2/2003 | Alpha | G06F 16/316 |

(Continued)

FOREIGN PATENT DOCUMENTS

| | | |
|---|---|---|
| CN | 104504008 A | 4/2015 |
| EP | 1344152 B1 | 12/2015 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Matthew Smithers
(74) *Attorney, Agent, or Firm* — Peter K. Suchecki

(57) ABSTRACT

A method for automated determination of IP address information of malicious attacks. An intrusion detection system may receive an index tree for storing IP addresses in one or more nodes of the index tree in a predefined sorting order. The instruction detection system may receive a data structure including a first set of one or more IP addresses from a honeypot system. The intrusion detection may receive unstructured data indicative of a second set of one or more IP addresses from a predefined data source. The intrusion detection system may process the unstructured data to determine the second set of one or more IP addresses. The intrusion detection system may insert each IP address of the first and second sets of one or more IP addresses into one or more nodes of the index tree.

20 Claims, 7 Drawing Sheets

(56) References Cited

U.S. PATENT DOCUMENTS

| | | | |
|---|---|---|---|
| 2010/0050262 A1* | 2/2010 | Knapp | H04L 69/22 |
| | | | 726/25 |
| 2013/0347113 A1 | 12/2013 | Yu et al. | |
| 2014/0108375 A1 | 4/2014 | Hendry | |
| 2016/0055233 A1 | 2/2016 | Wang et al. | |
| 2016/0212159 A1* | 7/2016 | Gupta | H04L 63/145 |
| 2016/0248792 A1 | 8/2016 | Tidwell et al. | |
| 2016/0321255 A1* | 11/2016 | Granacher | G06F 16/2386 |
| 2016/0337388 A1* | 11/2016 | Hu | H04L 63/1491 |
| 2017/0171221 A1 | 6/2017 | Ho et al. | |
| 2018/0159876 A1* | 6/2018 | Park | G06F 16/9024 |
| 2018/0324193 A1 | 11/2018 | Ronen et al. | |
| 2019/0370601 A1* | 12/2019 | Anil Kumar | G06F 16/2465 |

\* cited by examiner

INTRUSION DETECTION SYSTEM FOR AUTOMATED DETERMINATION OF IP ADDRESSES

BACKGROUND

The present invention relates to the field of digital computer systems, and more specifically, to automated determination of IP address information of malicious attacks.

Threat intelligence systems provide real time actionable data for security systems, such as firewalls. Observed attacks from IP addresses are processed and sent to customer devices to ensure immediate protection. Security incidents that may be caused by such attacks are further analyzed for defining security solutions by gathering a significant amount of information describing the attacks. However, this may take a tremendous amount of time which may compromise the reactivity of the threat intelligence systems.

SUMMARY

Embodiments of the present disclosure include a method, computer program product, and intrusion detection system for automated determination of IP address information of malicious attacks. An intrusion detection system may receive an index tree configured to store one or more IP addresses in one or more nodes of the index tree in a predefined sorting order. The intrusion detection system may receive structured data including a first set of one or more IP addresses associated with malicious attacks from a honeypot system. The intrusion detection system may receive unstructured data indicative of a second set of one or more IP addresses from a predefined data source. The intrusion detection system may process the unstructured data to identify the second set of one or more IP addresses. The intrusion detection system may store the first set of one or more IP addresses and the second set of one or more IP addresses in the index tree according to the predefined maximum size for the one or more nodes, wherein each node of the one or more nodes includes a corresponding IP address level for each IP address of the first set of one or more IP addresses and the second set of one or more IP addresses.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
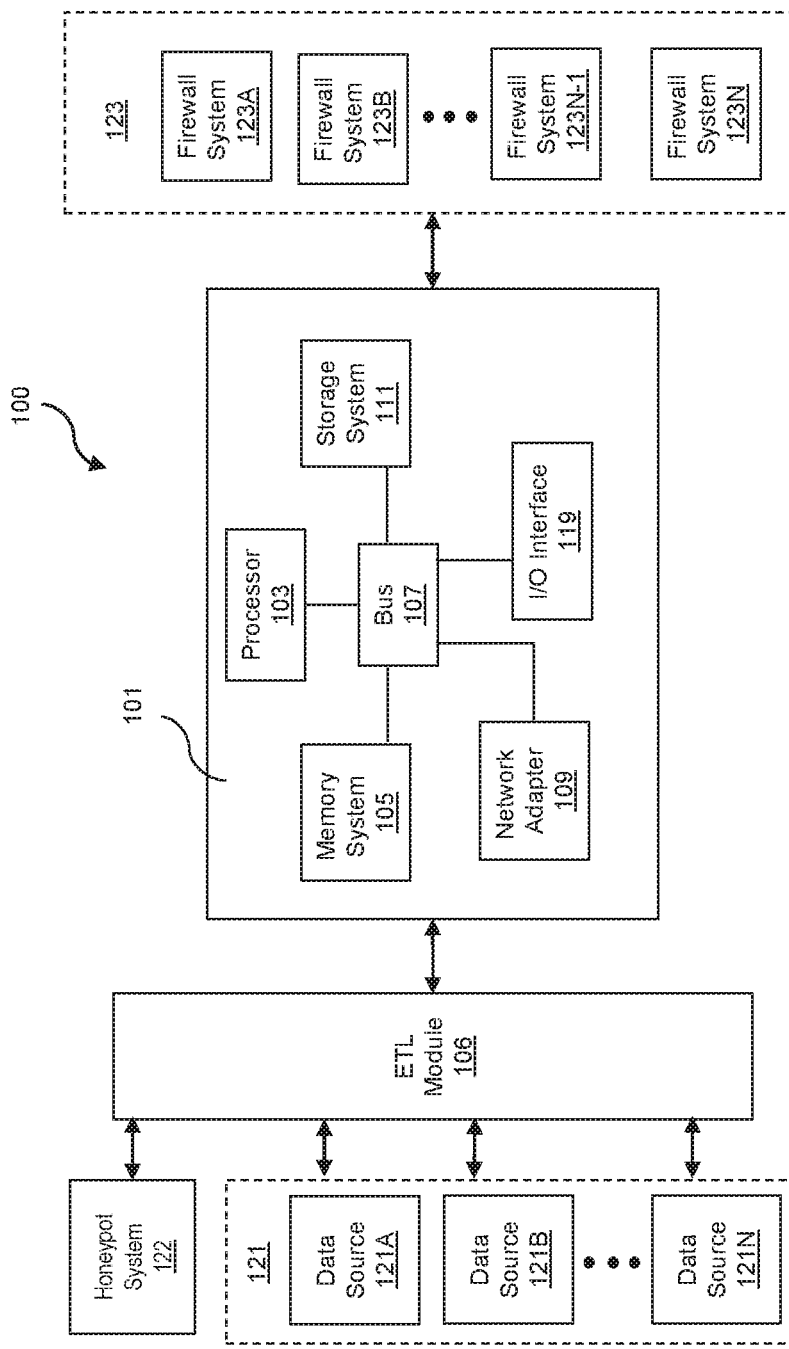
FIG. 1 illustrates a block diagram of a threat intelligence system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer systems, and more particularly to improvements in database management systems for querying data.

Database management systems may be utilized to store and retrieve various types of data within a database (e.g., NoSQL database, relational database, etc.). Various databases store data in different ways. A relational database system uses Structured Query Language (SQL) for querying and maintaining the database. A non relational database (NoSQL) provides a mechanism for storage and retrieval of data that is modeled in means other than the tabular relations used in a relational database, such as unstructured data. NoSQL databases use different data structures than relational databases, making some operations faster and more flexible in NoSQL databases.

Relational databases may be maintained by a database management system, such as a Relation Database Management System (RDBMS), wherein data is organized into one or more tables of columns and rows. An index tree may be provided to enable the RDBMS quicker access to data stored within the database when performing querying functions.

The present disclosure discloses a database management system configured to receive both structured and unstructured data, wherein the structured data is matched with the unstructured data based on similar attributes prior to being added to an index tree. Once matched, the structured data and processed unstructured data may be added to the index tree by aggregating the data with nodes containing structured data have matching attributes to both the structured and unstructured data sets. Transforming the unstructured data and adding it to the index tree provides the database management system with optimal accessibility to the data when querying the database. In some embodiments, the database management system may balance the index tree by spreading data to various nodes based on predefined node sizes and rules.

Using the present disclosure's method of creating an index tree with structured and unstructured data allows data to be spread over fewer documents, resulting in significantly less index access steps. In some embodiments, the database management system reduces queries to less than 10 steps, in contrast to 128 steps with a naïve index. The present disclosure achieves less query steps by significantly reducing the size of the data stored within the index tree. In one embodiment, the resulting index tree of the present disclosure comprised of 140k documents of 15 kb each, as opposed to a naïve index comprising of 10 million documents of roughly 200 bytes each.

For illustrative purposes, embodiments of the present disclosure as applied to IP reputation/malicious attack detection are described in detail herein. In one embodiment, the database management system is exemplified as an instruction detection system for determining IP address information associated with malicious attacks. However, it should be noted that the methods and systems described in the present disclosure can be implemented to improve relational database management systems used for other purposes, and the examples described here should not be taken as limiting.

A honeypot system is a system that is configured to be probed, attacked or compromised by cyber attackers (e.g., hackers). The honeypot system may be used to lure hackers by exposing known vulnerabilities deliberately. The honeypot system may be configured to gather and record information and attack patterns, e.g., information related to a hacker's location, the hacker's behavior and the tools used by the hacker, copies of worms and payloads which hackers use to compromise the system, etc. For example, during the time a hacker has access to the honeypot system, hacker activities may be logged to collect information defining his/her actions and techniques. This information may be used to find security solutions for network attacks and prevent them in the future. The honeypot system, for example, may be a spam honeypot for processing spam emails for identifying IP address sources of the spam emails. The honeypot system may comprise, for example, an operating system (OS) and applications. The honeypot system may provide, for example, output data in a document store structured format such as XML or JSON formats or in a table format comprising one or more tables.

The level or tree level of an IP address may indicate if the IP address is a single device address or a subnet address, wherein the level of a subnet address may be determined by the prefix length of the subnet address. For example, the tree level of a node may be less than or equal to the prefix length of the address stored in the node.

A malicious attack refers to an attempt to harm or else take advantage of a system and network in various ways such as phishing, through use of computer viruses, worms, rootkit, botnets and zombies, adware and spyware, etc. A malicious attack may be characterized by IP packets. An IP packet may comprise a header which precedes the body of the packet and contains routing information, including an IP address which is the address of the source of the IP packet.

The present system and method may enable efficient storing and querying of structured data of a document store, e.g., as provided by honeypot systems, while still allowing it to be augmented with meta data obtained from different sources such as websites. This may enable more secure and protected data centers when using the produced enhanced information on malicious attacks. The information associated with IP addresses related to malicious attacks is stored in an efficient and compact way to enable a fast and optimal search. Thus, a fast reaction to attacks may be enabled which may further increase security and protection of customer devices against malicious attacks.

Referring now to FIG. 1, illustrated is a block diagram of a threat intelligence system 100, in accordance with embodiments of the present disclosure. The threat intelligence system 100 comprises an intrusion detection system 101. The intrusion detection system 101 may be a computer system. The components of intrusion detection system 101 may include, but are not limited to, one or more processors 103, a storage system 111, a memory system 105, and a bus 107 that couples various system components including the memory system 105 to the processor 103. The memory system 105 may include computer system readable media in the form of volatile memory, such as random access memory (RAM) and/or cache memory.

In some embodiments, the intrusion detection system 101 may include a variety of computer system readable media. Such media may be an available media that is accessible by intrusion detection system 101, wherein the media includes both volatile and non-volatile media, removable and non-removable media.

In some embodiments, the intrusion detection system 101 may communicate with one or more external devices such as a keyboard, a pointing device, a display, etc.; one or more devices that enable a user to interact with intrusion detection system 101; and/or any devices (e.g., network card, modem, etc.) that enable the intrusion detection system 101 to communicate with one or more other computing devices. Such communication can occur via one or more I/O interfaces 119. The intrusion detection system 101 may communicate with one or more networks, such as a local area network (LAN), a general wide area network (WAN), and/or a public network (e.g., the Internet) via a network adapter 109. As depicted, the network adapter 109 communicates with the other components of the intrusion detection system 101 via the bus 107.

The memory system 105 is configured to store a plurality of applications that are executable on the processor 103. For example, the memory system 105 may comprise an operating system as well as application programs. The methods described herein may at least partly be implemented in a software application stored in the memory system 105.

The intrusion detection system 101 may be connected to one or more data sources 121A-N. Hereinafter, in the interest of clarity one or more data sources of data source 121A-N may be referred to as 121. The connection to the data source 121 may be via a wired connection or via a network, which may be a public network, such as the Internet, a private network, such as a wide area network (WAN), or a combination thereof. The data of the data source 121 may be received via an Extract-Transform-Load (ETL) module 106.

The data source 121 may comprise web-based or mobile-based internet applications that allow the creation, access and exchange of user-generated content that is ubiquitously accessible. The web-based application may, for example, comprise social media platforms and image/video sharing platforms, really simple syndication (RSS) feeds, blogs, wikis and news. The data source 121 may, for example, provide data in the form of unstructured text that is accessible through the web.

In some embodiments, the intrusion detection system 101 may be configured for receiving data from a honeypot system 122. The data of the honeypot system 122 may be received via ETL module 106. The connection to the honeypot system 122 may be via a wired connection or via a network, which may be a public network, such as the Internet, a private network, such as a wide area network (WAN), or a combination thereof. The honeypot system 122 may be configured to identify attackers by IP-addresses which can be used in filter rules and block the access to production systems. The data received from the honeypot system 122 may be in a predefined structure indicative of the identified IP addresses of the attackers and information on the attackers. For example, the honeypot system 122 may be configured to provide one or more tables as output, wherein each table comprises attributes or columns indicative of the attack and the attacker. For example, a first table may comprise attributes indicative (e.g., for a given record) of the session ID, the start time and end time of the session, corresponding IP address of the attacker, the SSH client the attacker used, and IP addresses (e.g., a range of IP addresses) that have the same specific pattern as the present attack described by at least the given record. Another table may indicate detailed information about the inputs for an attack, such as session ID, timestamp, the command used, and also information if the command were successful or not.

For example, data obtained from a blog may describe an attack from one IP source and identify it with a Botnet attacking banks. The honeypot system 122 may identify multiple attacks with a specific pattern from a wide range of IP addresses. The specific pattern may match the pattern of the attack of the IP address identified in the blog. Thus, the combination of the data from the honeypot system and the data source 121 may be advantageous as it may provide further information on attacks.

The data source 121 and honeypot system 122 may be configured to send automatically or upon request data sets to the intrusion detection system 101. The data may be received via the ETL module 106. The ETL module 106 may be configured to extract or receive data from the data source 121 and perform an ETL process on the received data. For example, the ETL module 106 may be configured to extract data from data source 121, e.g., as an XML resource, transform it to a predefined structure through encoded rules to fit user needs, and load it into the intrusion detection system 101. The transformation of the data may comprise the transformation of the format or notation of the signatures (e.g., IP address) into a predefined format. This may be advantageous as different sources may provide the same signature but may be formatted differently. Using the ETL module 106 may enable a common format.

The received data from the data source 121 and the honeypot system 122 may be processed by the intrusion detection system 101 as described with reference to FIG. 2, FIG. 3, and FIG. 4.

Although shown as a separate component, the ETL module 106 may be part of the intrusion detection system 101. The intrusion detection system 101 may further be configured to connect to a data store for storing data of the intrusion detection system 101. The data store may be part of the storage system 111.

The intrusion detection system 101 may be connected to one or more firewall systems 123A-N (collectively referred to as firewall system 123) of respective internal networks. The connection to the firewall system 123 may be via a wired connection or via a network, which may be a public network, such as the Internet, a private network (e.g., a wide area network (WAN)), or a combination thereof. Each of the firewall systems 123A-N may be configured to monitor and control incoming and outgoing network traffic from the respective internal networks based on predetermined security rules. The security rules may be updated using the data (e.g., the data may comprise IP addresses and related information obtained from the honeypot system 122 and the data sources 121) received from the intrusion detection system 101.

The intrusion detection system 101 may be configured to process the received data of the data source 121 and honeypot system 122 in order to identify IP addresses indicated in the received data and associated information such as session IDs, start and end time, etc.

The IP addresses may have an IPv6 format. An IPv6 address may be represented by the notation: 'ipv6-address/prefix-length', wherein the prefix-length is a decimal value specifying how many of the leftmost contiguous bits of the address comprise the prefix. The prefix length may indicate the level of the IP address. IPv6-address is an IPv6 address such as the following address: '2001:db8:3333:4444:5555:6666:7777:8888'. The level of an IP address may indicate if the IP address is an end device address or a subnet address. For example, the address '2001:db8:3333:4444:5555:6666:7777:8888' may have the lowest level as it is the address of a node, while a subnet address such as '2001:db8:3333:4444:\64' may have the level corresponding to the prefix 64.

The IP address may be written to indicate both a node address (or an interface of the node) and a subnet address with a prefix (e.g., the node's subnet prefix). For example, a node address may be '2001:0DB8:0:CD30:123:4567:89AB:CDEF' and its subnet address or number may be '2001:0DB8:0:CD30:\60'. The subnet address '2001:0DB8:0:CD30:\60' covers the node address '2001:0DB8:0:CD30:123:4567:89AB:CDEF' and may cover other node addresses. The IP addresses may be IPv6 unicast type addresses.

The identified IP addresses may be stored in an index tree. The index tree may be a previously created index or may be newly created. The present disclosure enables storing the IP addresses, as described with reference to FIG. 2, in an index tree. In some embodiments, the index tree may be a B-tree. The index tree may comprise nodes, wherein the prefix length of IP addresses indicate the level of the index tree. For example, the root node may have a level 0, and the child nodes of the root node may have a level 1 and so on. In one example, the level of the nodes may be defined as the classless interdomain routing (CIDR) level.

The nodes in the index tree may be inserted in a predefined sorting order. The sorting order indicates, for a given node of the tree, the values (or addresses) of the left subtree of the given node as being smaller than the value (address) of the given node and the values (addresses) of the right subtree of the given node are higher than the value of the given node. The comparison between addresses may be performed as follows. For example, when comparing a first address a1:a2:a3:a4:a5:a6:a7:a8 with a second address b1:b2:b3:b4:b5:b6:b7:b8, the comparison is performed step-wise between the 8 elements of the address (between the hexadecimal digits values). For example, ai and bi (where i=1-8) are first compared and if they are different (e.g., if ai is higher than bi), then the first address is higher than the second address. If ai and bi are equal, the following comparison is performed between a(i+1) and b(i+1) until all elements are compared or until the comparison of two elements indicate that one is higher than the other.

In some embodiments, each node of the tree may be assigned a predefined maximum size. For example, each node may be assigned a maximum of two documents (e.g., JSON documents).

Figure 2:
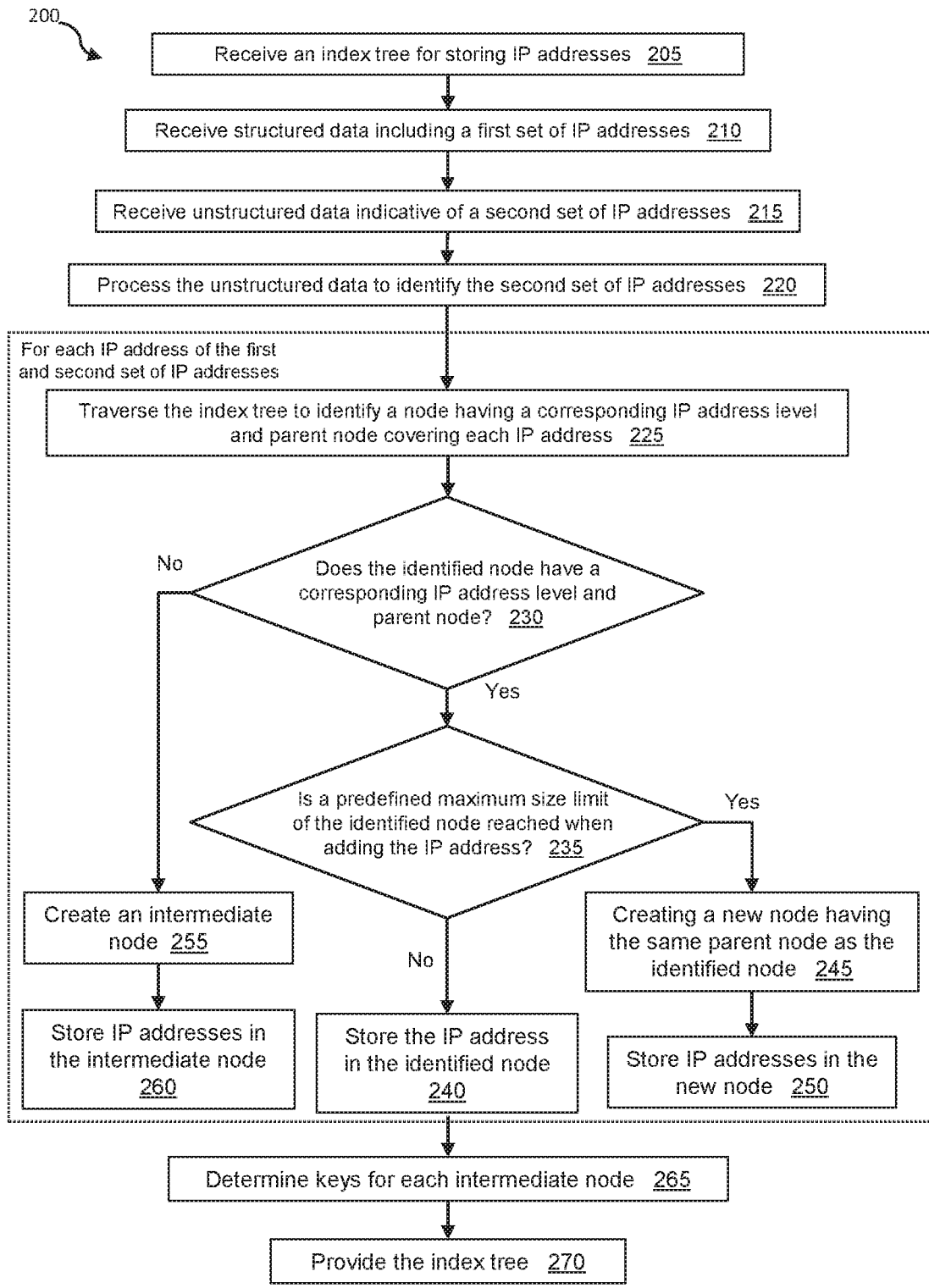
FIG. 2 illustrates a flow diagram of an example process for automated determination of IP address information of malicious attacks, in accordance with embodiments of the present disclosure.

Referring now to FIG. 2, illustrated is a flow diagram of an example process 200 for automated determination of IP address information of malicious attacks, in accordance with embodiments of the present disclosure. The process 200 may be performed by the intrusion detection system 101 exemplified in FIG. 1.

The process 200 begins by receiving an index tree for storing IP addresses and any associated information, such as session IDs, start and end time, etc. This is illustrated at step 205. In some embodiments, the index tree may be previously available or newly created. The index tree is configured for storing IP addresses in one or more nodes of the tree in a predefined sorting order. Each node of the index tree is further assigned a predefined maximum size. Each IP address is indicative of one device address or a range of multiple device addresses, wherein each level of the index tree is defined by a respective prefix length of IP addresses. For example, the intrusion detection system 101 may store an index tree having two nodes, a root node having an address '4000:12' and child node having an address '4000:: 3'. The child node address is an end device address. Thus, the root node has a level 2 which is the value of the prefix length and the child node has the lowest level. In another example, a new index tree (e.g., having a root node comprising an address that covers a number of subnets) may be created and the IP addresses may be inserted in the newly created index tree in accordance with the present method.

The process 200 continues by receiving a data structure indicating a first set of one or more IP addresses from a honeypot system 122 exemplified in FIG. 1. This is illustrated at step 210. The received data structure may be, as described with reference to FIG. 1, a table having attributes indicating the first set of IP addresses and related information.

The process 200 continues by receiving unstructured data from a predefined data source (e.g., a data source 121 such as blogs). This is illustrated in step 215. The unstructured data is indicative of a second set of one or more IP addresses. In some embodiments, the unstructured data may be unstructured textual data. For example, the unstructured data may be online data from social media and other web sites that is collected in the form of unstructured text. The receiving of the unstructured data may be received in response to performing a site scraping, web harvesting or web data extraction.

The process 200 continues by processing the unstructured data to identify the second set of IP addresses. This is illustrated in step 220. For example, the unstructured data may be parsed and analyzed using natural language processing to determine the IP addresses and associated metadata.

Once the second set of IP address is identified, both the first set of IP addresses and the second set of IP addresses are inserted and/or merged into the index tree (as described at steps 225-260). For each IP address of the first set and second set of IP addresses steps 225-260 may be performed. Each IP address of the first and second sets of IP addresses may have the format described with reference to FIG. 1 (e.g., the IP address may be a node address or a subnet address having a prefix length value).

For example, the honeypot system 122 (as exemplified in FIG. 1) may see attacks with a specific pattern from a wide range of IP addresses including the one mentioned in the unstructured data of a blog. Then, the merging phase (as described at steps 225-260 of inserting both sets of IP addresses or merging both sets of IP addresses in the index tree) combines this knowledge and a security expert will retrieve it by querying for any IP address in the identified range.

For each IP address from the first set and second set of IP addresses, the process 200 continues by traversing the index tree to identify a node having a corresponding IP address level and a parent node whose address covers the IP address. This is illustrated in step 225. Following the above example, and assuming that the IP address to be inserted is '4000::5'. Since the IP address has the lowest level as being an address of an end device, the node '4000::3' is the corresponding node and has a parent node '4000:12' which covers the address '4000::5'.

To identify a suitable node for storage, the process continues by querying whether an identified node has a corresponding IP address level and parent node covering the IP address. This is illustrated in step 230. If the node has both a corresponding IP address level and parent node covering the IP address, then the process continues by querying whether the identified node has enough space to add the IP address and associated information to the identified node before reaching a predefined maximum size. This is illustrated in step 235. If the predefined maximum size will not be reached when adding the IP address and associated information, then the process continues by storing the IP address and associated information in the identified node. This is illustrated in step 240.

In some embodiments, the identified node will reach or surpass the predefined maximum size when the IP address and associated information is added to the node. In such an occurrence, the process continues by creating a new node having the same parent node as the identified node within the index tree. This is illustrated in step 245. The new node may be created in the index tree in accordance with the sorting order for storing the IP address and associated information, wherein the new node has the same parent node as the identified node. Once the new node is created, the process continues by storing each IP address and associated information within the new node. This is illustrated in step 250. Following the above example, the address '4000::5' is higher than the address '4000::3' and thus the associated node can be created as a right child node of the root node '4000:12', while the node '4000::3' is the left child node of the root node '4000:12'.

In some embodiments, a node having a corresponding IP address level and parent node may not be identified in steps 225-230. If no node is identified, the process continues by creating an intermediate node. This is illustrated in step 255. The intermediate node is created in accordance with the sorting order for storing the IP address and associated information. Once the intermediate node is created, the process continues by storing the IP address(es) and associated information within the intermediate node. This is illustrated in step 260.

In some embodiments, the intrusion detections system determines keys for each intermediate node. This is illustrated in step 265. The keys may be determined for each intermediate node and the root node using the IP addresses of the node and the respective child nodes. For example, IP addresses of intermediate nodes and the root node may be provided as keys. The keys may be used to indicate which nodes may be covered by a requested IP address.

Once each IP addresses has been stored in a respective node and the keys have been identified, the process continues by providing the index tree. This is illustrated in step 270. The index tree may be provided for enabling search of IP addresses in the index tree using the keys. For example, the tree may be provided to the firewall systems 123A-N, such that each of the Firewall systems 123A-N may use the index tree for identifying suspicious IP addresses and may block respective requests.

In some embodiments, the index tree may not be received at operation 205. For example, the index tree may not exist the first time the process 200 is performed. Instead, when the system performs process 200 the first time, the steps outlined in operations 225-260 may act to generate a new index tree that contains the first and second set of IP addresses identified at operations 210-220.

Figure 3:
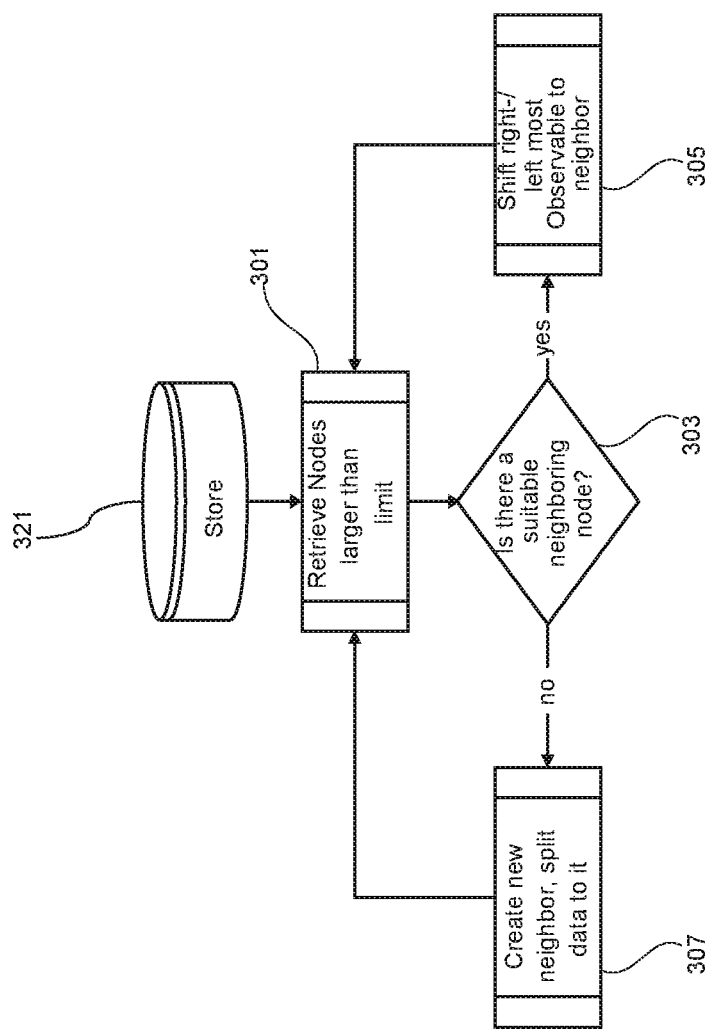
FIG. 3 illustrates a flow diagram of an example process for balancing an index tree, in accordance with embodiments of the present disclosure.

Referring now to FIG. 3, illustrated is a flow diagram of an example process 300 for maintaining (e.g., balancing) an index tree, in accordance with embodiments of the present disclosure. In some embodiments, the provided index tree (e.g., the resulting index tree from process 200 exemplified in FIG. 2) within the store 321 can become arbitrarily unbalanced. In order to guarantee efficient retrieval, it may be regularly balanced by the intrusion detection system.

In some embodiments, the process begins by the intrusion detection system identifying one or more nodes of the index tree having a size higher than a predefined threshold or limit. This is illustrated in step 301.

Once the one or more nodes are identified that have a size over the predefined threshold, the process continues by determining for each of the one or more identified nodes if a neighboring node of a same level and having a same parent node whose size is smaller than the predefined threshold exists (e.g., a node on the same level of the tree having the same parent as the examined node and having enough space). This is illustrated in query step 303. If a neighboring node with a smaller size than the predefined threshold exists, the process continues by moving or splitting the content of each identified node of the one or more nodes having a size higher than the predefined threshold into the neighboring node of the same level in order to balance the index tree. This is illustrated in step 305. If so, the right/leftmost observable (e.g., an IP address and its associated information) in the node is moved (step 305) to the neighbor node, depending on the position of the neighbor relative to the identified node.

In some embodiments, no suitable neighboring node exists as illustrated in step 303. In such an occurrence, the process continues by creating a child node within the index tree in accordance with the predefined sorting order as the child node of a parent node. Once the new child node is created, the content of the identified node having a size over the predefined threshold is split between the new child node and the identified node. This is illustrated in step 307. This step allows the index tree to be balanced if no available neighboring node exists.

Figure 4:
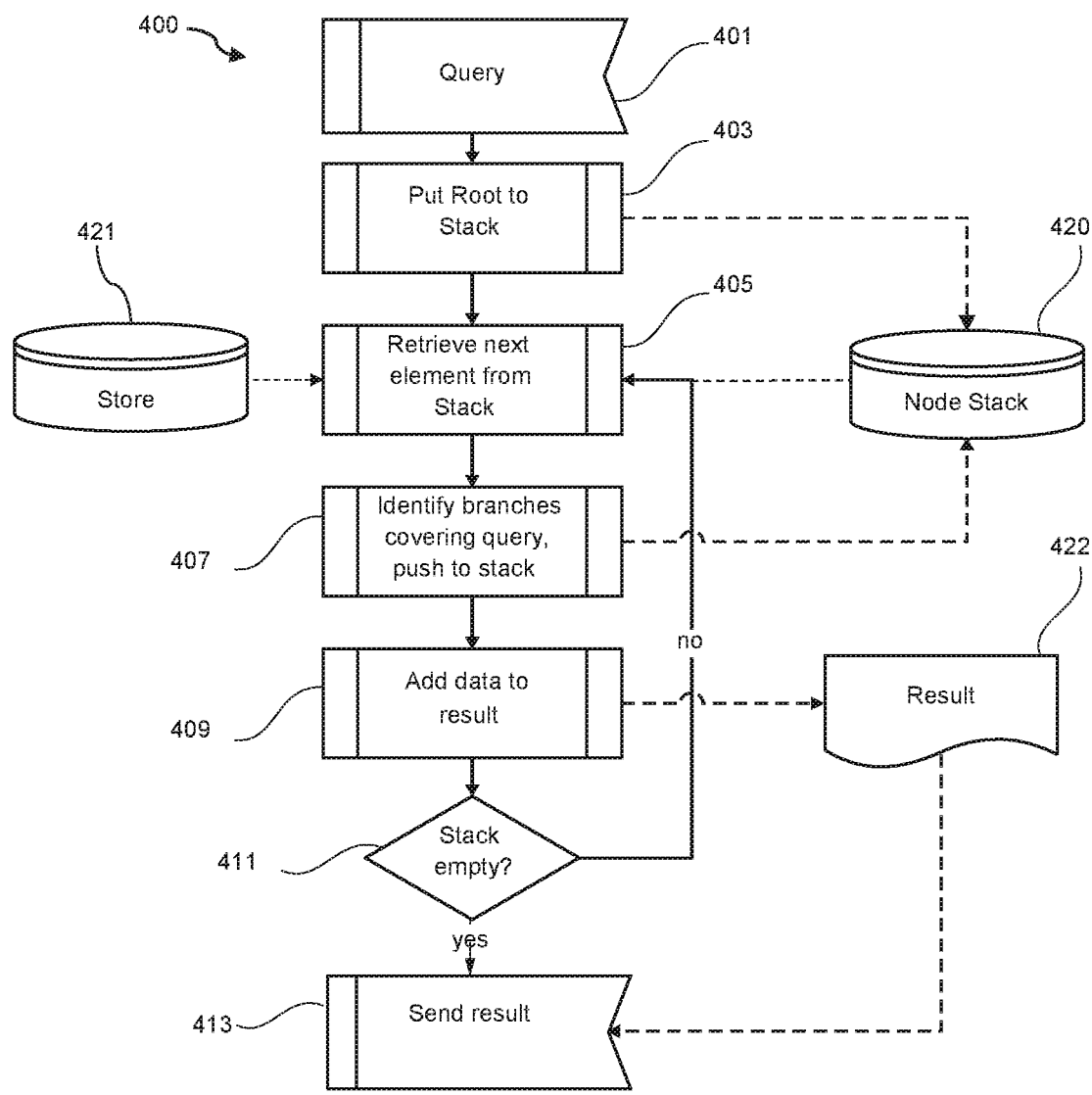
FIG. 4 illustrates a flow diagram of an example process for querying an index tree, in accordance with embodiments of the present disclosure.

Referring now to FIG. 4, illustrated is a flowchart of a process 400 for querying an index tree, in accordance with embodiments of the present disclosure. In some embodiments, the intrusion detection system will receive a query for a request of information for an IP address and associated information stored within the index tree. This is illustrated in step 401.

Once the query is received, the process continues by placing the root node including its data in a node stack 420, thereby constituting a first element of the node stack. This is illustrated in step 403. A next element (not processed yet) may be retrieved from the node stack 420 and becomes the current element. This is illustrated in step 405. Additional metadata related to the current element may for example be retrieved from the store 421 shown in FIG. 4.

The process continues by traversing one or more nodes of the index tree and iteratively determining for each currently traversed node, a subtree of the index tree that covers the requested IP address until reaching a leaf node of the tree or reaching an intermediate node having no subtree covering a requested IP address. This is illustrated in step 407. The branches (or child nodes) of the current element are identified and pushed or stored in the node stack, resulting in further elements in the node stack 420.

The data of the current element are stored in a result 422 of the received query. This is illustrated in step 409. Once the stack is empty (inquiry step 411), the process continues by providing information of a matching node of the index tree, wherein the matching node is the leaf node or the intermediate node, respectively. This is illustrated in step 413.

Otherwise, steps 401-411 may be repeated for a next element of the node stack until all elements of the node stack are processed.

Figure 5:
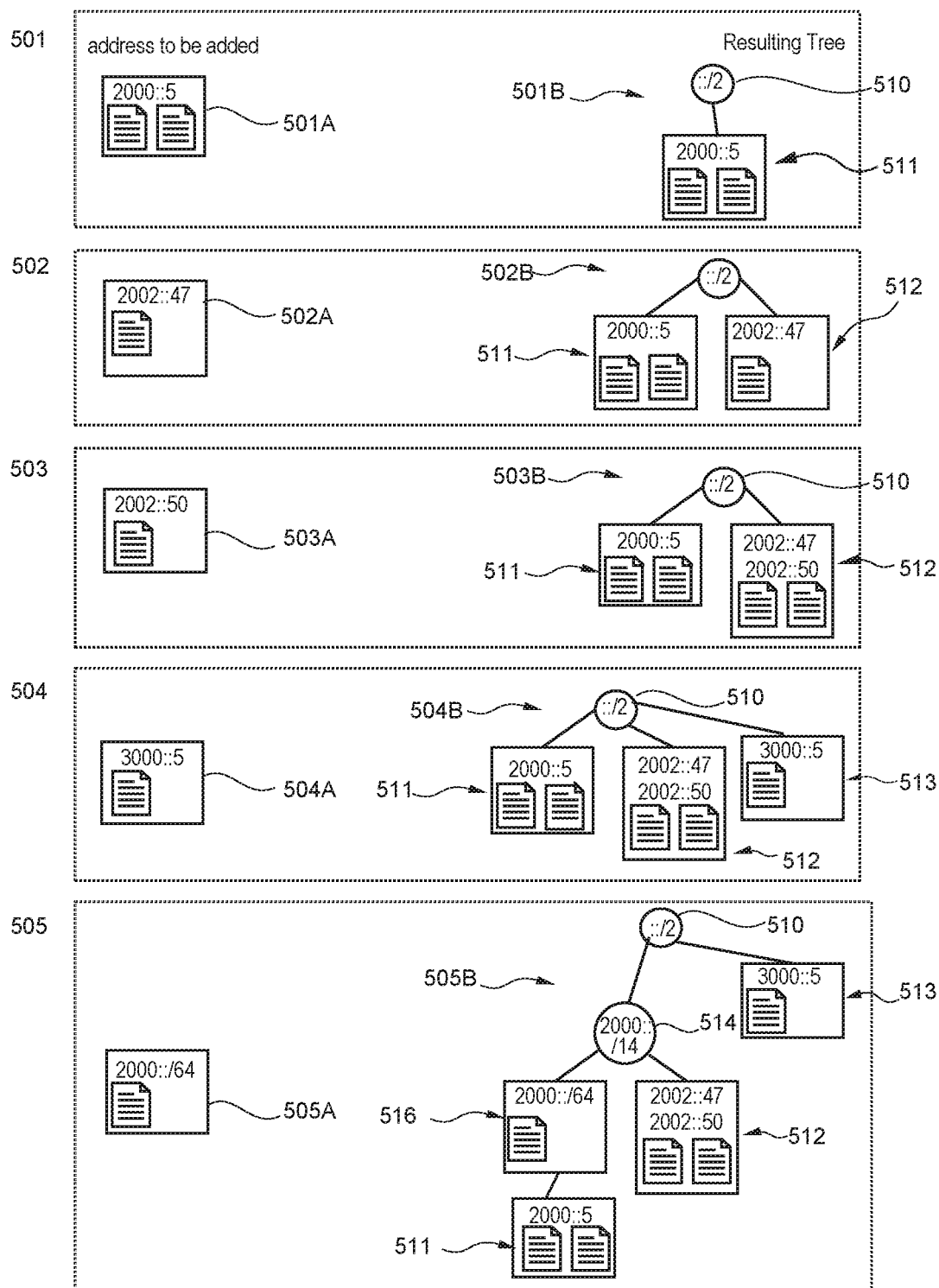
FIG. 5 is a flow diagram for building an example index tree, in accordance with embodiments of the present disclosure.

Referring now to FIG. 5, illustrated is a flow diagram for building an example index tree, in accordance with embodiments of the present disclosure. In some embodiments, the index tree to be built may be a B-tree. However, the present disclosure is not limited to B-trees. The diagram of FIG. 5 includes blocks 501-505 indicating the evolution of the built index tree. Each block 501-505 comprises an IPv6 address and associated information 501A-505A to be added as well as the resulting tree 501B-505B after insertion of the address 501A-505A. Each node of the tree may have a predefined maximum size. For example, the maximum size may be defined by the number of documents (or data points) to be stored in a node. For example, each document may comprise an IP address and any associated information, such as metadata.

The index tree may be generated, by creating a root node 510. The root node 510 may comprise an address of an overall network that covers subnetworks and devices. For example, the IP address in the root node 510 may be as follows "::/2", having a level 2 (e.g., covering addresses with levels higher than 2).

In block 501, the first IP address to be inserted is "2000::5". The first address 501A is associated with information which, for example, as indicated in FIG. 5 comprises two data points or documents. As it is the first address to be inserted and covered by the address "::/2" of the root node 510, it is directly attached in a new node 511 which is a child node of the root node 510.

In block 502, the next IP address 502A "2002::47" is a right neighbor of the first address '2000::5', in accordance with the sorting order defined above with reference to FIG. 1 (e.g., on the same CIDR level). As the information of the first address 501A already fills the node 511 (because it has two data points) completely with data, a new neighboring node 512 is created and filled with the new second address and associated information 502A.

In block 503, a third IP address '2002::50' 503A is to be inserted in the tree. The address '2002::50' 503A fits to the right of the observable address '2002::47' in accordance with the sorting order (because 50>47 and thus the address 2002::50 is higher than 2002::47). As both addresses 502A and 503A are only associated with one data point, there is still enough space to fit it in the node 512. Thus, the address 503A is then added to the node 512 as indicated in block 503.

In block 504, a fourth IP address '3000::5' associated with one data point of information is to be inserted in the tree. The address 504A fits right to the node 512, because the address 3000::5 is higher than the address 2002:50. As the node 512 is full having two data points, a new node 513 is created attached to the root node 510 as a child node of the root node 510.

In block 505, a fifth address 2000::/64 is added. The fifth address 505A is a subnet address whose range covers the first address 501A. Accordingly, a new node 514 having address '2000:114' may be created so as to be the parent node of the node 516 of the fifth address 2000::/64 and the node 512. Adding the node 514 may prevent having a large number of branches connected to the root node. In another example, the node 2000::/14 may not be added and the node 2000::/64 may be inserted as a child node of the root node. The data associated with the address '2000:164' may also be relevant for addresses '2000::5'.

The resulting index tree 505B may thus be provided for searching IP addresses. For example, the address 2000::/14 of intermediate node 514 and address 2000::/64 may be provided as keys of the tree. In one example, the address of the root node may also be provided as a key. For example, a query for the address '2000::5' may be executed as follows. Starting from the root node, the covering branches are identified, which leads to the node 514 having address '2000:114'.

Next, the information stored in node 514, which is covered by the query, is retrieved. Further, the branches of node 514 covering the query are identified. Here, the data and address 505A stored in node 516 is therefore added to the result of the query. Next, the branches of node 516 covering the query are identified. Here, address '2000::5' of node 511 matches the query, and its information is added to the result. As a result, all three parts of information including the root node information and the information of the nodes 514, 516 and the information of the node 511 are returned. In another example, only part of the information of nodes 510, 514, 516 and 511 is provided (e.g. only information of node 511).

In another alternative embodiment, a computer-implemented method for aggregating directed relational data for a database management system is provided. The database management system receives a structured data set and an unstructured data set from a data source. The database management system processes the unstructured data set by comparing the unstructured data set to the structured data set to find a set of matching attributes to create a processed data set. The database management system traverses a structured document store to determine a second set of structured data having a similar set of attributes to the processed data set. The database management system aggregates the second set of structured data with the processed data set to create an aggregated data set. The database management system creates an index tree by utilizing the attributes from the aggregated data set. The database management system stores the index tree in the structured document store.

In an alternative embodiment, a method is provided for automated combination of structured and unstructured data for efficient search and update generation for security devices by means of a common threat intelligence architecture, wherein said threat intelligence architecture comprises at least one security mechanism exposed to the internet for identifying internet attackers by providing structured data about the Internet attacker and intelligence feeds from sources providing unstructured data about internet attacker, wherein said structure data includes at least an IP address and said unstructured data includes at least an IP address with meta data, wherein said threat intelligence architecture comprises a common classification layer for pre-processing said input from said security mechanism and said intelligence feeds, said method comprising the steps of: receiving pre-processed structured and unstructured data from said classification layer, matching structured with unstructured data resulting in an IP address with meta data, looking up in the structured document store for the best matching IP address or IP address subnet including its meta data, aggregating of best matching IP address or IP address subnet including its meta data with the new meta data, creating an index tree of IP addresses and subnets by analyzing the subnet ranges of each block and merging index elements to reach a given size iteratively until the root node is reached, storing said index tree of IP addresses and subnets including their meta data in said structured document store, retrieving information for each search including IP address or IP address subnet by comparing IP address or IP address subnet to data in root node and determining subnet range to follow using look up node and comparing subnet ranges until data block is reached with the best matching IP address sub net and extracting meta data of said IP address subnet and automatically providing it to customer. The method further comprises the steps of: splitting created document in blocks of defined size for balancing the amount of information of each block, if created document is too large, before creating said index tree. The method further comprises the steps of: automatically using pre-processed structure data from said classification layer for update generation of said security devices at customer side.

According to one embodiment, the method further comprises balancing the tree by: identifying one or more nodes of the tree having a size higher than a predefined threshold; for each identified node determining if a neighboring node of the same level and having the same parent node whose size is smaller than the threshold exists; in case the neighboring node exists moving content of the identified node in the neighboring node; otherwise creating a new node in the tree in accordance with the sorting order as a child node of that parent node and storing the content in the new node. This embodiment may enable splitting groups in blocks of a defined size for balancing the amount of information for each group. As the resulting tree can become arbitrarily unbalanced, in order to guarantee efficient retrieval, it may regularly be balanced. For example, if an examined node contains more information than a pre-defined limit, the balancing process starts. First, it is evaluated if there is a feasible neighboring node, e.g. a node on the same level of the tree having the same parent node and enough space. If so, the right-/leftmost observable in the examined node is moved to the neighbor node, depending on the position of the neighbor relative to the node. If not, a new neighbor is created and the information is split up between the new neighbor node and the examined node.

According to one embodiment, the method further comprises: in response to receiving a request of information for an IP address: traversing the tree and iteratively determining for each current traversed node the subtree of the tree that covers the requested IP address until reaching a leaf node of the tree or reaching an intermediate node having no subtree covering the requested address, and providing the information of a matching node of the tree, wherein the matching node is the leaf node or the intermediate node respectively. The created tree structure enables an efficient and fast search of IP addresses. For example, the search may start from the root and it iteratively traverses all branches covered by a query, and at least part of all encountered matching information is merged to the result. For example, the matching information may be provided in accordance with the following embodiments e.g. depending on user needs.

According to one embodiment, the method further comprises providing information of the key of the parent node of the matching node covering the requested IP address. The information of the matching node may be provided as well. This may provide a focused search result and avoid retrieving unnecessary information.

According to one embodiment, the method further comprises providing information of all the keys of the parent node of the matching node.

According to one embodiment, further comprises providing information of all traversed nodes on the path between the root node and the matching node. Having the full information that relates to a requested IP address may enable to find better security remedies for the attacks involving the requested IP address.

According to one embodiment, the sorting order indicates for a given node of the tree the values of the left subtree of the given node are smaller than the value of the given node and the values of the right subtree of the given node are higher than the value of the given node.

According to one embodiment, receiving of the unstructured data comprises querying the data source for new data and in response to the querying receiving the unstructured data. In another example, the receiving of the unstructured data may be performed on a periodic basis e.g. every day.

According to one embodiment, receiving of the data structure comprises querying the honeypot system for new data and in response to the querying receiving the data structure. In another example, the receiving of the data structure may be performed on a periodic basis e.g. every day.

According to one embodiment, the predefined source comprises one or more websites, the IP addresses are IPv6 addresses, and the index tree is a B-tree.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
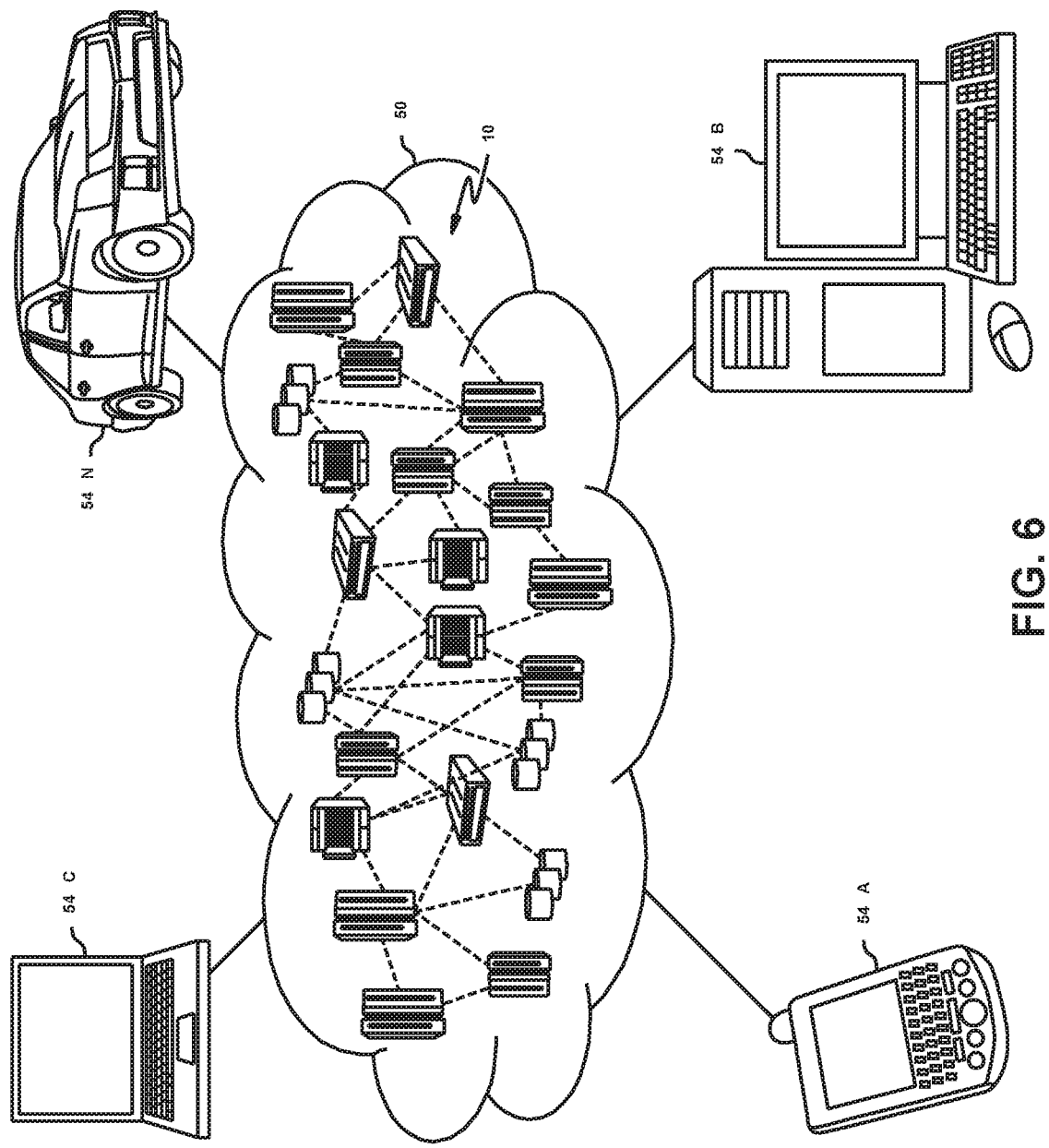
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
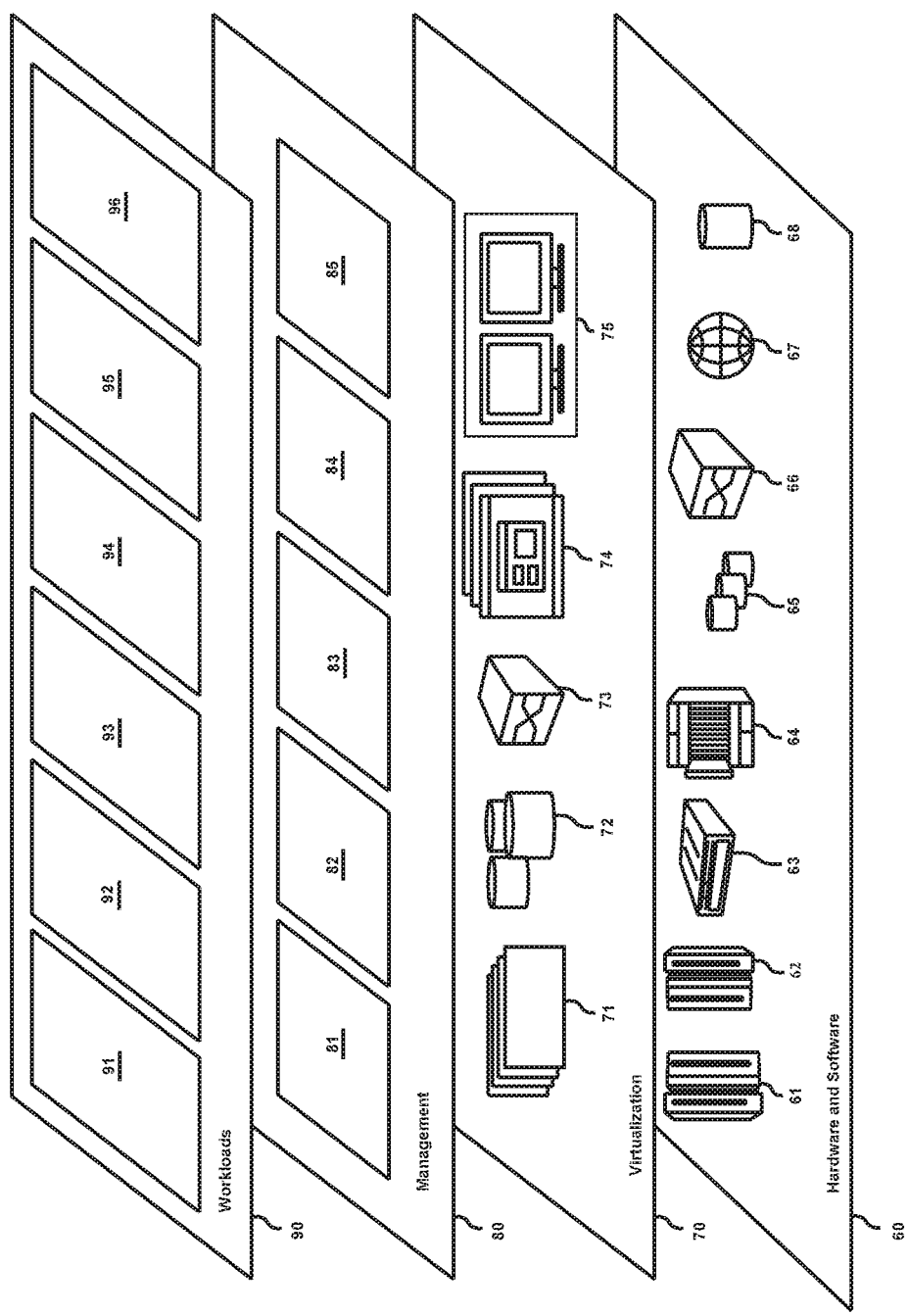
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer-implemented method for automated determination of IP address information of malicious attacks, the method comprising:

receiving, by an intrusion detection system, an index tree, wherein the index tree is configured to store one or more IP addresses and associated information in one or more nodes of the index tree in a predefined sorting order, wherein each node of the one or more nodes is assigned a predefined maximum size;

receiving, by the intrusion detection system, structured data including a first set of one or more IP addresses from a honeypot system;

receiving, by the intrusion detection system, unstructured data indicative of a second set of one or more IP addresses from a predefined data source;

processing, by the intrusion detection system, the unstructured data to identify the second set of one or more IP addresses; and storing, by the intrusion detection system, the first set of one or more IP addresses and the second set of one or more IP addresses in the index tree according to the predefined maximum size for the one or more nodes, wherein each node of the one or more nodes includes a corresponding IP address level for each IP address of the first set of the one or more IP addresses and the second set of one or more IP addresses.

2. The method of claim 1, wherein storing the first set of one or more IP addresses and the second set of one or more IP addresses in the index tree includes:
   determining, by the intrusion detection system, the predefined maximum size for each node of the one or more nodes of the index tree;
   determining, by the intrusion detection system, the corresponding IP address level for each node of the one or more nodes of the index tree;
   traversing, by the intrusion detection system, the index tree to identify a node having a corresponding IP address level for each IP address of the first set of one or more IP addresses and the second set of one or more IP addresses, wherein the node having a corresponding IP address level includes a parent node having an IP address covering each IP address of the first set of one or more IP addresses and the second set of one or more IP addresses;
   storing, by the intrusion detection system, each IP address of the first set of one or more IP addresses and the second set of one or more IP addresses in the node having the corresponding IP address level if the predefined maximum size is not reached.

3. The method of claim 2, wherein traversing the index tree to identify a node having a corresponding IP address level includes:
   creating, by the intrusion detection system, a new node in the index tree in accordance with the predefined sorting order for storing one or more IP addresses and associated information if the predefined maximum size of the node having the corresponding IP address level is reached, the new node having a same parent node as the node having the corresponding IP address level;
   storing, by the intrusion detection system, each IP address of the first set of one or more IP addresses and the second set of one or more IP addresses in the new node.

4. The method of claim 1, the method further comprising:
   creating, by the intrusion detection system, an intermediate node in the index tree in accordance with the predefined sorting order for storing one or more IP address and associated information if the node having the corresponding level for each IP address of both the first set of one or more IP addresses and the second set of one or more IP addresses fails to be identified;
   storing, by the intrusion detection system, each IP address of the first set of one or more IP addresses and the second set of one or more IP addresses in the intermediate node.

5. The method of claim 1, the method further comprising:
   determining, by the intrusion detection system, keys for each intermediate node using the IP addresses of the intermediate node and respective child nodes;
   providing, by the intrusion detection system, the index tree for enabling searches of IP addresses in the index tree using the keys for each intermediate node.

6. The method of claim 1, the method further comprising:
   identifying, by the intrusion detection system, one or more nodes of the index tree having a size higher than a predefined threshold;
   determining, by the intrusion detection system, for each identified node of the one or more nodes of the index tree, if a neighboring node of a same level and having a same parent node whose size is smaller than the predefined threshold exists;
   moving, by the intrusion detection system, content of each identified node of the one or more nodes having a size higher than the predefined threshold into the neighboring node of the same level if the neighboring nodes exists in order to balance the index tree.

7. The method of claim 6, the method further comprising:
   creating, by the intrusion detection system, a child node in the index tree in accordance with the predefined sorting order as the child node of a parent node and storing content in the child node if no available neighboring node exists.

8. The method of claim 1, the method further comprising:
   receiving, by the intrusion detection system, a request of information for an IP address;
   traversing, by the intrusion detection system, one or more nodes of the index tree and iteratively determining for each currently traversed node, a subtree of the index tree that covers the requested IP address until reaching a leaf node of the tree or reaching an intermediate node having no subtree covering a requested IP address;
   providing, by the intrusion detection system, information of a matching node of the index tree, wherein the matching node is the leaf node or the intermediate node, respectively.

9. The method of claim 8, the method further comprising:
   providing, by the intrusion detection system, information of the key of a parent node of the matching node covering the requested IP address.

10. The method of claim 9, the method further comprising:
    providing, by the intrusion detection system, information of all traversed nodes on a path between a root node and the matching node.

11. The method of claim 1, wherein the sorting order indicates for a given node of the index tree values of a left subtree of the given node are smaller than a value of the given node and values of a right subtree of the given node are higher than the value of the given node.

12. The method of claim 1, wherein the index tree includes one or more IP address levels, wherein each IP address level of the one or more IP address levels of the index tree are defined by a respective prefix length of IP addresses stored therein.

13. An intrusion detection system, comprising:
    an index tree, wherein the index tree is configured to store one or more IP addresses and associated information in one or more nodes of the index tree in a predefined sorting order, wherein each node of the one or more nodes is assigned a predefined maximum size;
    a processor; wherein the processor is configured to perform a method, the method comprising:
        receiving, by an intrusion detection system, an index tree, wherein the index tree is configured to store one or more IP addresses and associated information in one or more nodes of the index tree in a predefined sorting order, wherein each node of the one or more nodes is assigned a predefined maximum size;
        receiving, by the intrusion detection system, structured data including a first set of one or more IP addresses from a honeypot system;
        receiving, by the intrusion detection system, unstructured data indicative of a second set of one or more IP addresses from a predefined data source;

processing, by the intrusion detection system, the unstructured data to identify the second set of one or more IP addresses; and storing, by the intrusion detection system, the first set of one or more IP addresses and the second set of one or more IP addresses in the index tree according to the predefined maximum size for the one or more nodes, wherein each node of the one or more nodes includes a corresponding IP address level for each IP address of the first set of the one or more IP addresses and the second set of one or more IP addresses.

14. The intrusion detection system of claim 13, wherein storing the first set of one or more IP addresses and the second set of one or more IP addresses in the index tree includes:

determining, by the intrusion detection system, the predefined maximum size for each node of the one or more nodes of the index tree;

determining, by the intrusion detection system, the corresponding IP address level for each node of the one or more nodes of the index tree;

traversing, by the intrusion detection system, the index tree to identify a node having a corresponding IP address level for each IP address of the first set of one or more IP addresses and the second set of one or more IP addresses, wherein the node having a corresponding IP address level includes a parent node having an IP address covering each IP address of the first set of one or more IP addresses and the second set of one or more IP addresses;

storing, by the intrusion detection system, each IP address of the first set of one or more IP addresses and the second set of one or more IP addresses in the node having the corresponding IP address level if the predefined maximum size is not reached.

15. The intrusion detection system of claim 14, wherein traversing the index tree to identify a node having a corresponding IP address level includes:

creating, by the intrusion detection system, a new node in the index tree in accordance with the predefined sorting order for storing one or more IP addresses and associated information if the predefined maximum size of the node having the corresponding IP address level is reached, the new node having a same parent node as the node having the corresponding IP address level;

storing, by the intrusion detection system, each IP address of the first set of one or more IP addresses and the second set of one or more IP addresses in the new node.

16. The intrusion detection system of claim 13, wherein the method performed by the processor further comprises:

creating, by the intrusion detection system, an intermediate node in the index tree in accordance with the predefined sorting order for storing one or more IP address and associated information if the node having the corresponding level for each IP address of both the first set of one or more IP addresses and the second set of one or more IP addresses fails to be identified;

storing, by the intrusion detection system, each IP address of the first set of one or more IP addresses and the second set of one or more IP addresses in the intermediate node.

17. A computer program product comprising a computer readable storage medium having program instructions embodied therewith, the program instructions executable by an intrusion detection system to cause the intrusion detection system to perform a method comprising:

receiving, by an intrusion detection system, an index tree, wherein the index tree is configured to store one or more IP addresses and associated information in one or more nodes of the index tree in a predefined sorting order, wherein each node of the one or more nodes is assigned a predefined maximum size;

receiving, by the intrusion detection system, structured data including a first set of one or more IP addresses from a honeypot system;

receiving, by the intrusion detection system, unstructured data indicative of a second set of one or more IP addresses from a predefined data source;

processing, by the intrusion detection system, the unstructured data to identify the second set of one or more IP addresses; and storing, by the intrusion detection system, the first set of one or more IP addresses and the second set of one or more IP addresses in the index tree according to the predefined maximum size for the one or more nodes, wherein each node of the one or more nodes includes a corresponding IP address level for each IP address of the first set of the one or more IP addresses and the second set of one or more IP addresses.

18. The computer program product of claim 17, wherein storing the first set of one or more IP addresses and the second set of one or more IP addresses in the index tree includes:

determining, by the intrusion detection system, the predefined maximum size for each node of the one or more nodes of the index tree;

determining, by the intrusion detection system, the corresponding IP address level for each node of the one or more nodes of the index tree;

traversing, by the intrusion detection system, the index tree to identify a node having a corresponding IP address level for each IP address of the first set of one or more IP addresses and the second set of one or more IP addresses, wherein the node having a corresponding IP address level includes a parent node having an IP address covering each IP address of the first set of one or more IP addresses and the second set of one or more IP addresses;

storing, by the intrusion detection system, each IP address of the first set of one or more IP addresses and the second set of one or more IP addresses in the node having the corresponding IP address level if the predefined maximum size is not reached.

19. The computer program product of claim 18, wherein traversing the index tree to identify a node having a corresponding IP address level includes:

creating, by the intrusion detection system, a new node in the index tree in accordance with the predefined sorting order for storing one or more IP addresses and associated information if the predefined maximum size of the node having the corresponding IP address level is reached, the new node having a same parent node as the node having the corresponding IP address level;

storing, by the intrusion detection system, each IP address of the first set of one or more IP addresses and the second set of one or more IP addresses in the new node.

20. The computer program product of claim 17, wherein the method performed by the intrusion detection system further comprises:

creating, by the intrusion detection system, an intermediate node in the index tree in accordance with the predefined sorting order for storing one or more IP address and associated information if the node having the corresponding level for each IP address of both the first set of one or more IP addresses and the second set of one or more IP addresses fails to be identified;

storing, by the intrusion detection system, each IP address of the first set of one or more IP addresses and the second set of one or more IP addresses in the intermediate node.

\* \* \* \* \*